July 4, 1944.  J. E. RYAN  2,352,915
HAY BUCK AND STACKER
Filed Sept. 11, 1942  5 Sheets-Sheet 1

Inventor
John E. Ryan
Alfred G. Hague
atty

July 4, 1944.   J. E. RYAN   2,352,915
HAY BUCK AND STACKER
Filed Sept. 11, 1942   5 Sheets-Sheet 3
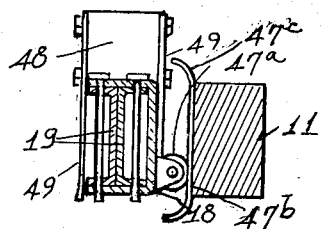
Fig. 7.
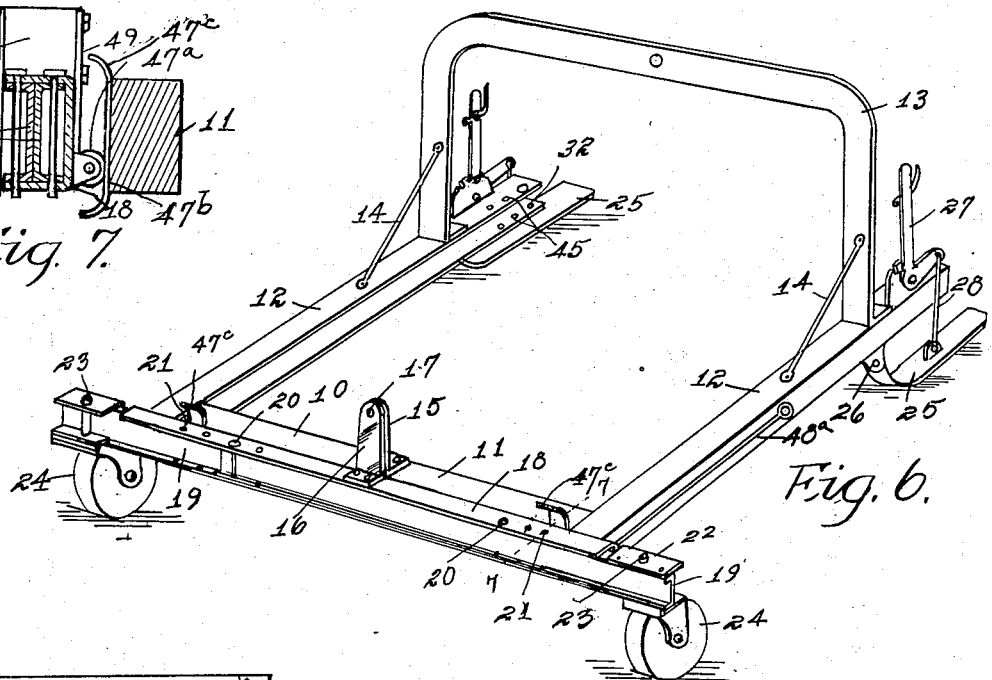
Fig. 6.
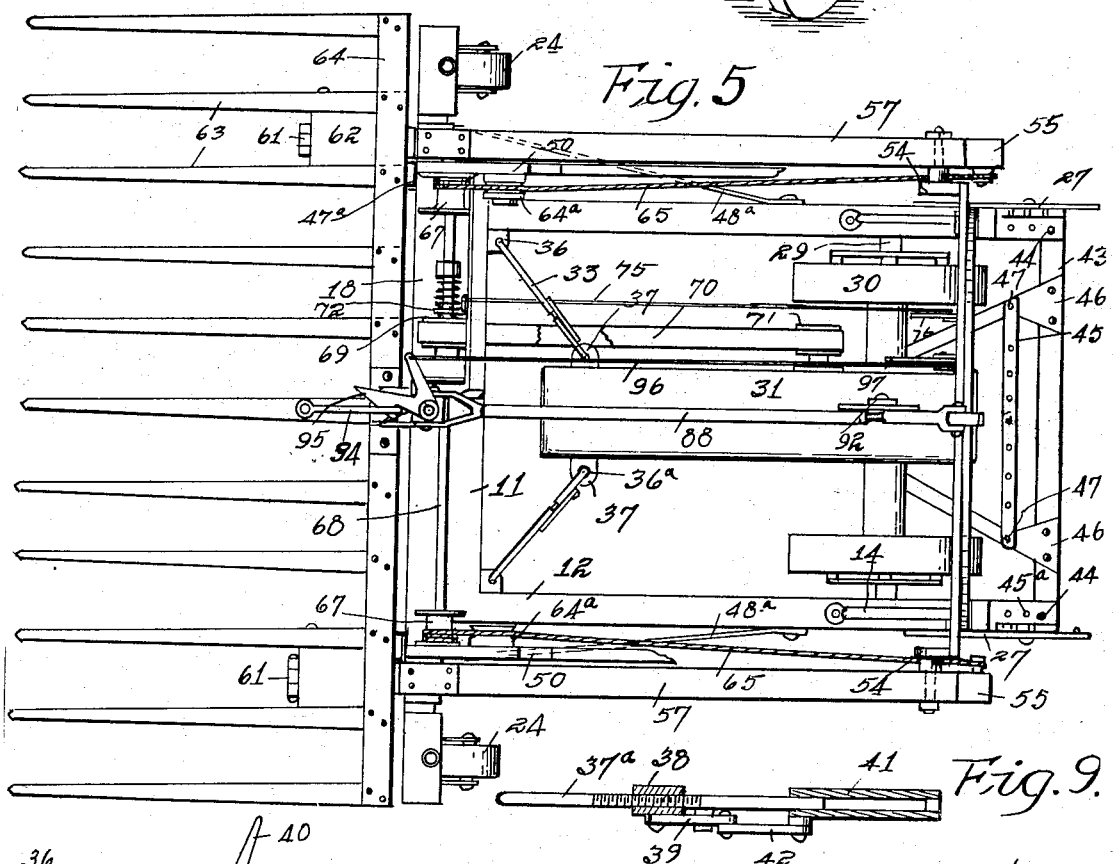
Fig. 5.
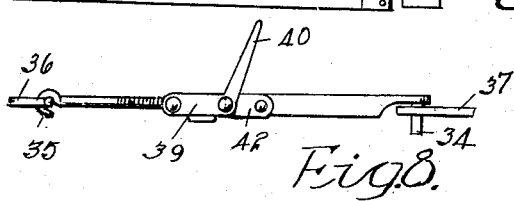
Fig. 8.
Fig. 9.
Inventor
John E. Ryan
Alfred G. Hagen atty.

July 4, 1944.   J. E. RYAN   2,352,915
HAY BUCK AND STACKER
Filed Sept. 11, 1942   5 Sheets-Sheet 5

Inventor
John E. Ryan.
Alfred G. Hague,
atty

Patented July 4, 1944

2,352,915

UNITED STATES PATENT OFFICE 2,352,915

HAY BUCK AND STACKER

John E. Ryan, Adair County, Iowa, assignor to Ryan Floating Stacker Company, Stuart, Iowa, a copartnership Application September 11, 1942, Serial No. 458,043

17 Claims. (Cl. 214—140)

This invention relates to improvements in hay bucks and stackers of that type adapted to be operated by means of the ordinary farm tractor and wherein the tractor is utilized to move the hay buck and stacker from place to place to first gather up the hay and then to carry it to the stack, after which it is elevated and dumped on to the stack by power derived from the tractor.

I am well aware that there are a large number of hay bucks and stackers in common use which are adapted to be carried by the tractor. These are objectionable in some ways due to the fact that the stacker and load carried thereby have to be supported by the tractor frame, which is an additional load and which necessarily has to be of comparatively small size in order to prevent upsetting of the tractor.

Another objection lies in the fact that oftentimes during hay-making season rain interferes with putting up the hay for a day or so, and if the attachment is connected directly to the tractor, it prevents the use of the tractor for other farm purposes, such as the cultivation of crops.

One of the objects of my invention is to provide an improved buck and stacker so constructed and arranged that the stacker is substantially self-supporting to the extent that substantially all of the weight of the load and the stacker is carried on its own wheels rather than on the tractor frame.

A further object of my invention is to provide in a stacker of the type above described, improved means wherein the tractor may be easily and quickly connected to and within the tractor frame so as to shorten up the length of the unit and wherein the tractor may be easily and quickly applied or removed.

A further object of my invention is to provide in a hay buck and stacker improved means for supporting and carrying the buck and stacker in the nature of a portable frame having caster wheels at its forward end supported substantially beneath the center of gravity of the load and the weight of the tractor when in operation, by which the tractor may be easily and quickly attached or detached and to which the stacker frame is detachably connected to the portable frame so that the said portable frame may be utilized for supporting other farm machinery such as binders, mowing machines and the like, and at the same time having the advantages of easily and quickly attaching the tractor.

A further object of my invention is to provide in a hay buck and stacker a portable frame for supporting the stacker which is easily and quickly connected to a tractor and wherein a certain amount of flexibility of connection between the stacker and the engine exists to permit the stacker to be advanced over uneven ground surfaces.

A further object is to provide in a combined buck and stacker of the type employing a buck rake and pivoted arms for supporting the rake and for elevating and lowering the rake, improved means for maintaining the buck rake substantially in horizontal position at any of its elevated positions.

A further object is to provide in connection with the construction above described, means for tilting the angle of the teeth of the buck relative to the ground surface at the time the buck is being loaded, to permit the ends of the teeth to engage and follow the ground surface while being loaded.

Referring to the accompanying drawings—

Figure 5 is a plan view of my improved buck and loader as applied to a tractor;

Figure 6 is a perspective view of what I shall term a portable frame, removed from the tractor and the stacker;

Figure 7 is a detail sectional view taken on the line 7—7 of Figure 6;

Figure 8 is a side elevation of one of the links for attaching the forward end of the tractor to a portable frame;

Figure 9 is a top view of the same, a portion of which is shown in section;

Figure 4:
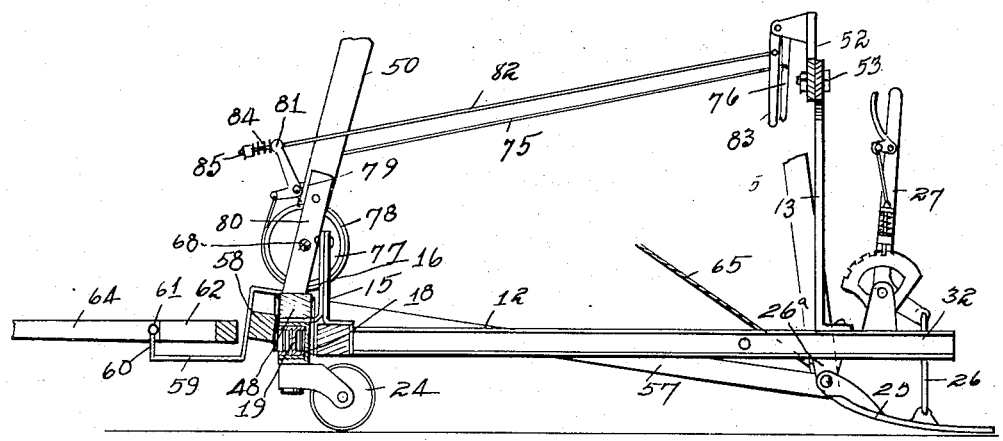
Figure 4 is a detail vertical sectional view taken on the line 4—4 of Figure 3.

My improved hay buck and stacker comprises what I shall term, for the sake of convenience, a portable frame 10, illustrated in Figure 6, having a front member 11 and side members 12 in the form of channel irons, the members 12 being spaced apart such distance and of such length as to receive between them a farm tractor. The rear ends of the frame members 12 are connected by an arch 13 of such height as to permit the tractor to be driven beneath the top of the arch and to give head clearance for the operator and the tractor. Braces 14 are provided to assist in holding the arch in its upright position. The front member 11 is provided with an upright bracket 15 to which a second bracket member 16 is pivotally connected by a pivot 17. The bracket 16 supports what I shall term an axle housing 18 which is preferably in the form of a channel iron having slidably mounted therein axle members 19, also in the form of channel irons, arranged back to back, as illustrated in Figure 7, the said members 19 being slidably mounted longitudinally of the member 18 and locked in various adjusted positions by means of pins 20 through openings 21 in the channel 18. The outer end of each of the members 19 is provided with upper and lower plates 22 to form brackets for supporting pivot pins 23 of the caster wheels 24.

By this arrangement it will be seen that the length of the axle formed by the members 18 and 19 may be adjusted as required.

For supporting the rear ends of the members 12 I have provided skids 25 each of which has its forward end pivotally connected to the bracket 26 carried by the members 12. A lever 27 is pivotally supported on each of the members 12, to which links 28 are connected, the lower ends of said links being connected to the skids 25, the levers 27 and the skids 25 providing means whereby the height of the free ends of the members 12 may be so adjusted that auxiliary axle members 29 detachably applied to the wheels 30 of a tractor 31 may be slid into the grooves 32 between the flanges of the member 12 as the tractor is driven into the space between said members 12. The said auxiliary axles 29 then provide means for supporting the weight of the portable frame, after which the levers 27 may be operated to lift the skids from the ground surface. The forward end of the tractor is connected to the forward end of the portable frame by means of adjustable links 33, one end of said links having a downwardly extending pin 34 and the other end a hook 35 being designed to enter an opening in the plate 36 fixed to the members 11 and 12, the pins 34 being designed to enter the openings 36a in the plates 37 carried by the forward end of the tractor. The link 33 is formed of a threaded rod 37a supporting a threaded sleeve 38 to which one end of a link 39 is pivotally connected, having an upwardly extending handle 40. The other portion of the link 33 is in the form of a sleeve 41 slidably mounted on the free end of the member 37a and pivotally connected to a link 42 which is also pivotally connected to the link 39, thus providing means whereby the hooks 34 and 35 may be separated by means of the handle 40 to permit the link 33 to be placed in position at the time the tractor is being connected up, after which the handle 40 may then be operated to pull the members 37a and 41 together. The distance between the members 34 and 35, when closed, is adjusted by means of the screw threaded sleeve 38.

A draw bar 43 is connected to the rear ends of the members 12 by means of pins 44 extending through openings 45a in said members 12.

The draw bar 43 is placed in position after the tractor has entered the portable frame and is connected to the tractor hitch bar 45 by means of plates 46 and pins 47, thus providing means whereby the rear end of the portable frame may be supported by the auxiliary axles 29 and the frame advanced over the ground surface by means of the bar 43 and the plate 46, the portable frame being guided by means of the links 33 as the tractor is guided.

In order to permit the axle 18 to oscillate freely I have provided a roller 47a mounted in a suitable bracket on the rear end of the member 18, with the roller engaging the front face of a plate 47b having curved end portions 47c, said rollers 47a being mounted near the ends of the member 18. I have also provided brace bars 48a having one end connected to the members 12 and the other end connected to the rear faces of the ends of the member 18, said brace bars 48a serving to prevent separation between the axle and the rollers 47a when the tractor is moved rearwardly and to relieve the pivot member 17 of excessive strain which would otherwise result therein.

Figure 2:
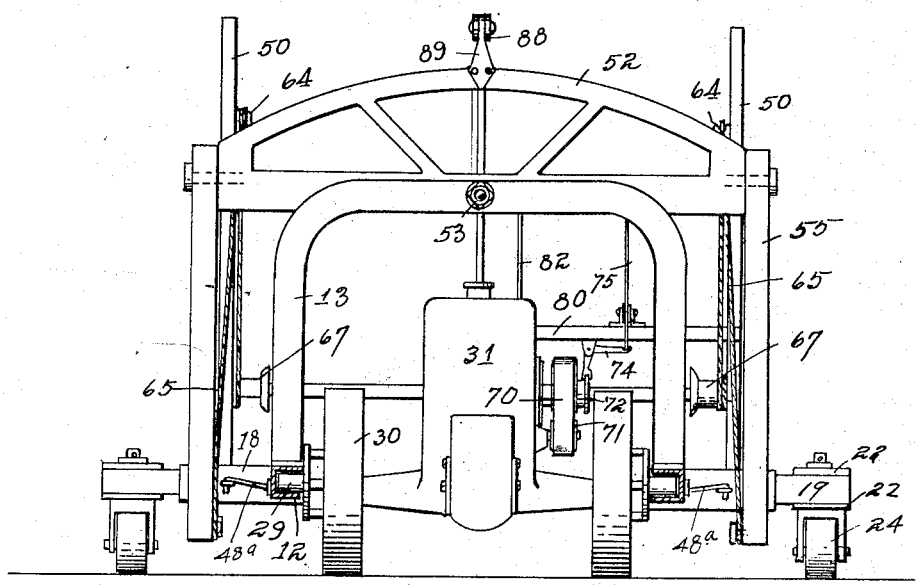
Figure 2 is a back elevation of the same.

I shall now describe what I shall term the stacker frame which comprises the beam 48 supported on top of the axle member 11 in a detachable manner; the beam 48 having downwardly extending bars 49 adapted to rest against the front and back surfaces of the axle to detachably support the beam thereon. Each end of the beam 48 is provided with an upwardly extending guide bar 50, each bar 50 having a horizontally arranged arm 51 connected to a transversely arranged frame member 52 (see Fig. 2), said frame member 52 being pivotally connected to the upper end of the arch 13 by means of a bolt 53. By removing the bolt 53 the said frame may then be detached from the portable frame simply by lifting the beam 48 from the axle 18. The forward face of the frame member 52 is provided with forwardly extending brackets 54, each providing means for pivotally mounting what I shall term the rake-supporting frame.

Said frame comprises vertically arranged arms 55 having their upper ends pivotally mounted to the brackets 54, and a downwardly and forwardly extending brace member 56, said members 55 and 56 having at their lower ends a horizontal arm 57, the forward ends of the arms 57 resting normally on top of the member 18. A cross beam 58 is connected and fixed to the forward ends of the members 57 and supported in front of the axle. Each of the members 57 is provided at its forward end with a hinge bracket 59, the forward end of each bracket terminating in an upwardly extending portion 60 connected to the hinge members 61, which in turn are mounted on blocks 62 mounted between teeth 63 forming a part of the buck rake 64. The hinges 61 are mounted between the front and rear ends of the teeth 63 so that the rake is substantially balanced with the rear end slightly heavier than the forward end, so that the rake is automatically returned to its horizontal position by gravity.

For raising and lowering the rake-supporting frame I have provided on the inner faces of the guides 50 pulleys 64a supporting cables 65, one end of each of the cables 65 being fixed to the pin 66 carried by the lower ends of the members 55. The opposite ends of the cables 65 are mounted on cable drums 67 carried by a shaft 68 also mounted in suitable bearings carried by the guides 50. The shaft 68 is provided with a pulley 69 supporting a belt 70 operated from the power take-off and pulley 71 of the tractor 31. The pulley 69 is provided with a clutch element 72 splined to the shaft 68 which is frictionally retained against one end of said pulley by means of a spring 73. A bell crank lever 74 is operatively connected with a flange 75 carried by the member 72 wherein the said member 72 may be moved outwardly from the pulley 69 to operatively disconnect the shaft 68 from the pulley 69. A cable 75 has one end attached to the lever 74 and the other end to a hand-operated lever 76, carried by the frame member 52, thus providing means for causing the shaft 68 to be operatively disengaged from the pulley 69. The shaft 68 is also provided with a brake drum 77 having a brake band 78, one end of which is connected to a bracket 79 carried by a support 80. The other end of the band 78 is connected to a bell crank lever 81 also connected to said bracket 79, the lever 81 being actuated by means of a rod 82 having one end connected to a hand-actuated lever 83. A spring 84 having one end resting against a collar 85 carried by the rod 82 and the other end resting against the lever 81 provides means for yieldably retaining the band in contact with the drum, wherein said spring will cause the brake band to automatically engage the brake drum so as to lock the load in any of its elevated positions.

When it is desired to lower the frame 57, together with the rake 64, the upper end of the lever 81 is moved forwardly, as viewed in Figure 4, thereby releasing the tension on the band 78 and allowing the drum 77 to rotate freely in an anti-clockwise direction.

In order to maintain the rake 64 substantially in a horizontal position as the rake is elevated and lowered, I have provided on the upper surface of the beam 58 a bracket 86 having pivotally supported thereon what I shall term a tilting bar 87, the upper end of the said bar 87 having pivotally connected thereto one end of a telescopic shaft 88, the rear end of said shaft 88 being pivotally connected to the upper end of a bracket 89 carried by the frame member 52. A bracket 90 is pivotally connected to the rear end of the shaft 88 and provided with a lever sector 91 to which a lever 92 is pivotally connected, the lever 92 being pivotally connected to the forward end of the shaft 88 to provide means for elongating or shortening the said shaft. This will also cause the bar 87 to be tilted vertically.

The back end of the rake 64 is provided with an upright guide rod 93 having a brace member 94 to provide a lever for lifting said rake on the hinges 61, the upper end of the bar 87 having a spring-actuated latch 95 slidably mounted on the guide rod 93. A rod 96 has one end connected to said latch and the other end to a trip lever 97 carried by the frame member 52. The vertical distance between the lower and upper pivot members of the tilting bar is substantially equal to the vertical distance between the pivot members at the upper ends of the members 55 and the pivot members at the rear end of the bar 88, so that the tilting bar will be maintained at substantially a given angle relative to the vertical when the rake is in any of its elevated or normal positions of movement. As the rake is elevated and lowered, the latch 95 slides along the guide member 93, as illustrated in dotted lines in Figure 1, on account of the hinges 61 being mounted ahead of and below the lower pivot of the bar 87.

The above described means for maintaining the rake in horizontal position is quite simple and comparatively cheap, and for certain types of stackers it is desirable wherein low stacks are formed. However, when it is desired to use the device in connection with the construction of high stacks the device is somewhat objectionable in that in order to maintain the vertical distance between the pivot members of the tilting bar 87 and the pivot members of the bar 55 and the rear pivot member of the bar 88 it is necessary to drop the pivot for the bar 55 below the top of the machine a considerable distance in order to maintain the said members in operative relation to accomplish the desired results.

Figure 10:
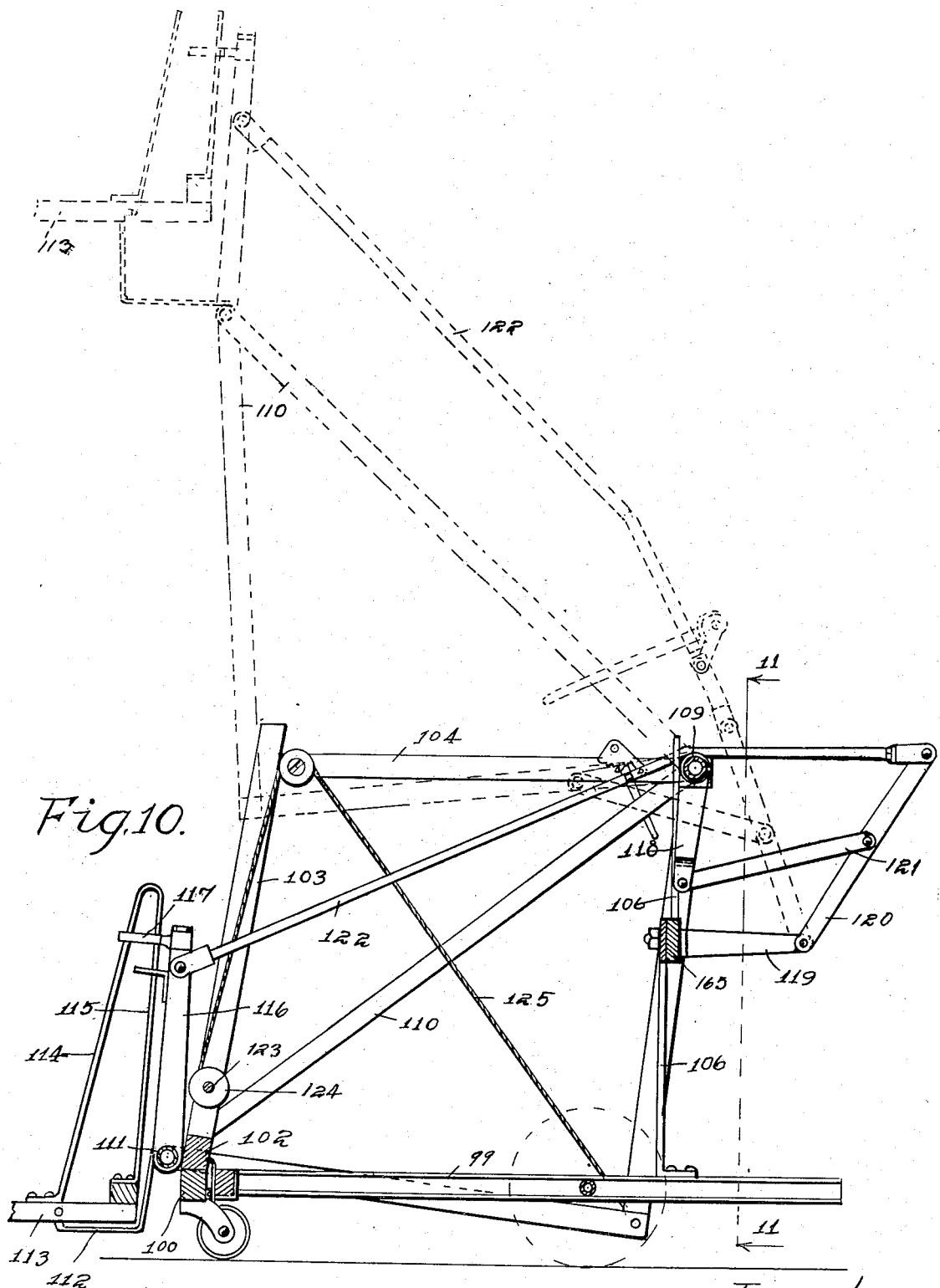
Figure 10 is a diagrammatical vertical sectional view of a modified form of the mechanism for supporting the rake in horizontal position as applied to my improved buck and stacker.
Figure 11:
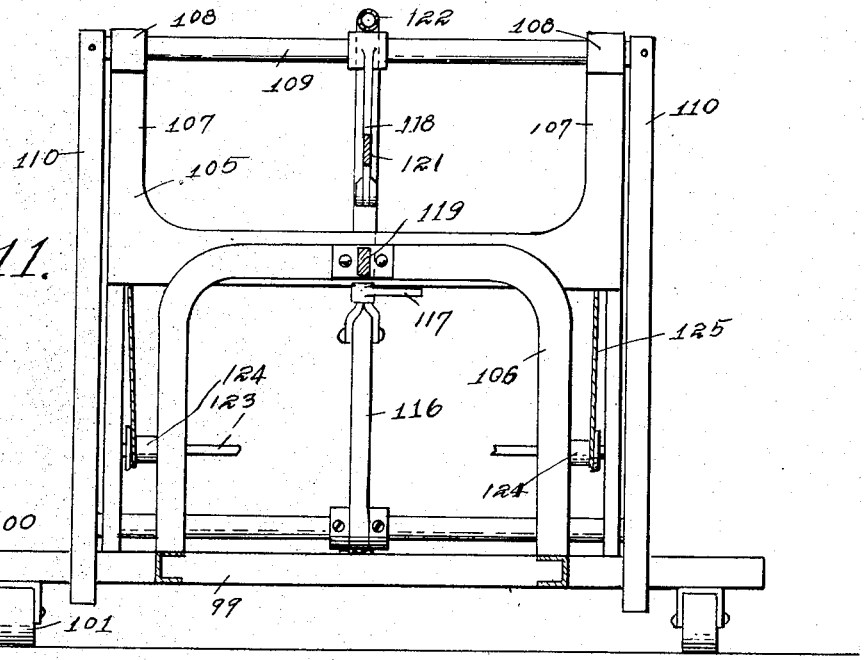
Figure 11 is a sectional view taken on the line 11—11 of Figure 10.
Figure 12:
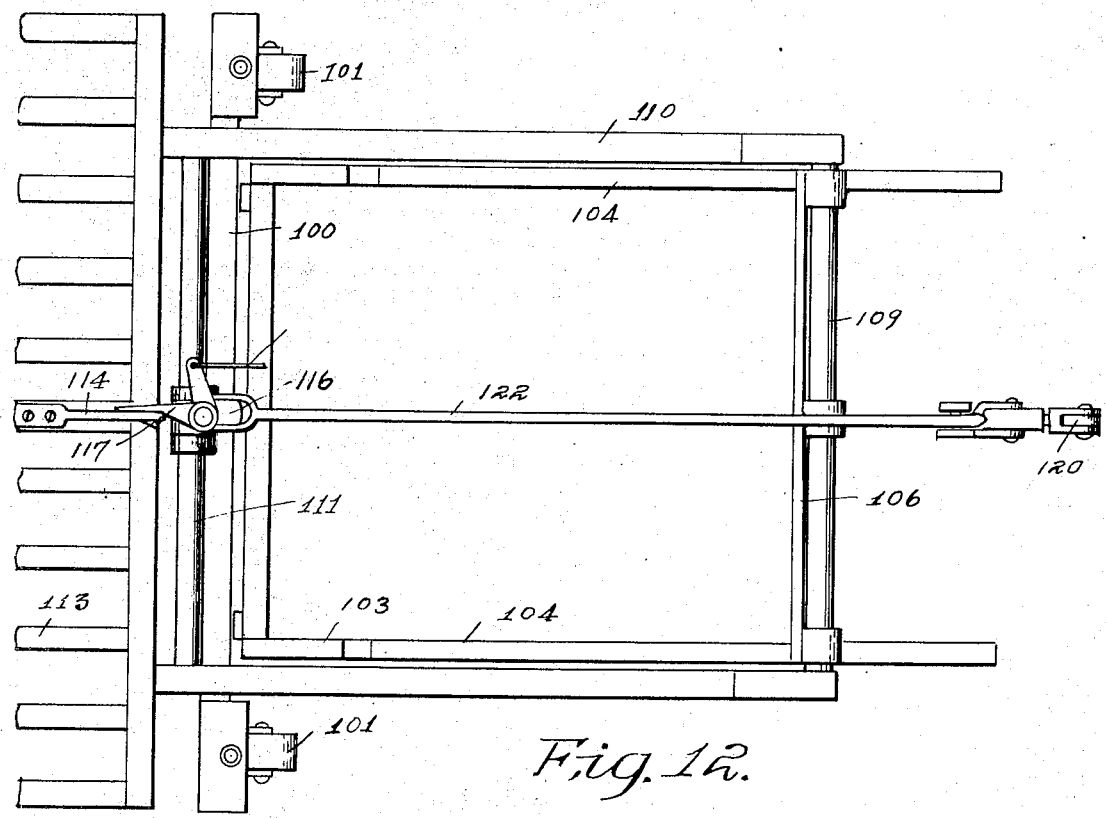
Figure 12 is a top view of Figure 10.

In Figures 10, 11 and 12 I have illustrated a modified form of the mechanism for maintaining the rake in horizontal position wherein the pivots of the rake-supporting frame can be supported at or near the top of the entire structure. The modified form also illustrates means for more rigidly maintaining the rake-supporting frame against twisting action such as might result in case a large portion of the weight carried by the rake was supported at one end. In these figures only such portions of the machine construction not relating to the means for maintaining the rake in horizontal position have been illustrated to show the operative relation and to provide support for said parts.

The numeral 99 indicates the portable frame adapted to surround a tractor having at its forward end an axle 100 for supporting said forward end, and wheels 101 for supporting said axle. The stacker frame comprises a horizontal beam 102 resting on the axle 100, and upright guides 103, together with the horizontal braces 104, the said braces 104 being connected to a frame member 105 at the back end of the frame and above the tractor, the said frame being pivotally connected to the arch 106 carried by the rear end of the portable frame similar to the arch 13. The frame member 105 is provided with upwardly extending portions 107, the upper end of each being provided with a bearing 108 for rotatably supporting a tubular rock shaft 109. Each end of the shaft 109 is provided with a triangular shaped frame member 110 having its upper and rear corner fixed to said shaft. The forward and lower ends of said frame members 110 are provided with a tubular shaft 111 which is also fixed to said frame members. By this construction the entire unit thus formed is held rigidly against twisting.

Rake-supporting brackets 112 are provided and connected to the forward ends of the frame members 110, having the rake 113 pivotally mounted thereon. A rake-balancing lever 114 is also provided having a guide rod 115. The central portion of the shaft 111 is provided with a tilting bar 116 which is pivotally supported on said shaft and having its upper end provided with a latch device 117 similar to the latch devices 95. The central portion of the shaft 109 is provided with a downwardly extending rock arm 118 which is fixed to said shaft.

The central portion of the frame member 105 is provided with a rearwardly extending bracket 119 having one end of a lever 120 pivotally connected thereto. A link 121 connects the lower end of the rock arm 118 with the central portion of the lever 120. A telescopic bar 122 similar to the bar 88 operatively connects the upper ends of the member 116 and the lever 120, the said bar 122 passing over the top of the shaft 109.

The frame member 103 is provided with a shaft 123 and cable drums 124 similar to the shaft 66 and the drums 67. Cables 125 are provided for operating the frame members 116 in a manner previously described. By this arrangement it will be seen that if the frame members 116 are elevated, together with the shaft 111, that the rake 113 will be elevated and that the shaft 109 will be rocked in a clockwise direction, causing said frame members and the rake to assume the dotted line positions shown in Figure 10, in which case the link 121 will move the upper end of the lever 120 in an anti-clockwise direction and move the rod 122 upwardly and forwardly to the inclined position illustrated in dotted lines, maintaining the tilting bar 116 in the same angular position relative to the vertical as when the frame was in its lowered position, thus providing means whereby the rake may be always maintained in a horizontal position during any of its upward and downward movements, and at the same time permitting the pivot center of the rake-supporting frames, which is the shaft 109, to be maintained at a point near the top of the entire frame structure. In this connection it should be understood that the device is adapted to be drawn over the highways and there is a limit to the height of the frame regulated by law so as to permit the device to pass beneath bridges and electric wires and other overhead structures. By this arrangement it will be seen that the pivot member 109 may be supported at a point slightly below this height fixed by law and, consequently, permit the rake 113 to be moved to the maximum height before being dumped.

In practical operation, assuming that the tractor has been placed in position within the portable frame 10 and that the tractor is connected therein, as illustrated in Figure 5, by means of the bar 43, the plate 46 and the draft bar 45, with the stub shafts 29 within the grooves 32 of the frame members 12 and the links 33 placed in position to provide means for guiding the portable frame as the tractor is advanced; any movement of the tractor and portable frame over uneven ground surfaces will cause the axle 18 to tilt or rock relative to the frame member 11 and the stacker frame carried thereby to rock with the axle 18, with its rear end swinging about the bolt 53 as a pivot, thereby permitting substantially the entire weight of the stacker frame and the buck rake to be carried by the caster wheels 24 without twisting the stacker frame all out of shape.

Figure 1:
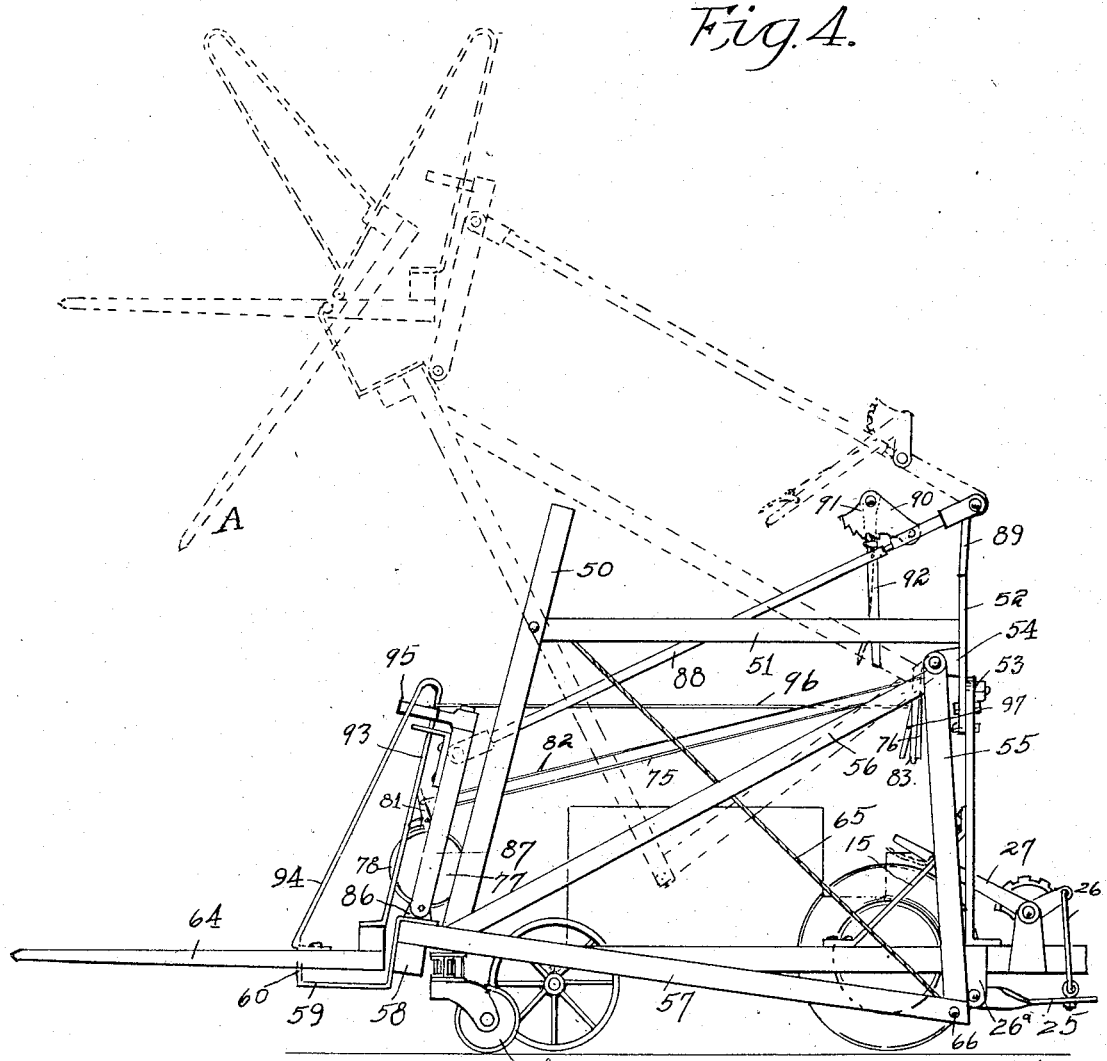
Figure 1 is a side elevation of my improved buck and stacker showing the buck in a horizontal loaded position in solid lines and the same buck in elevated stacking position in dotted lines.
Figure 3:
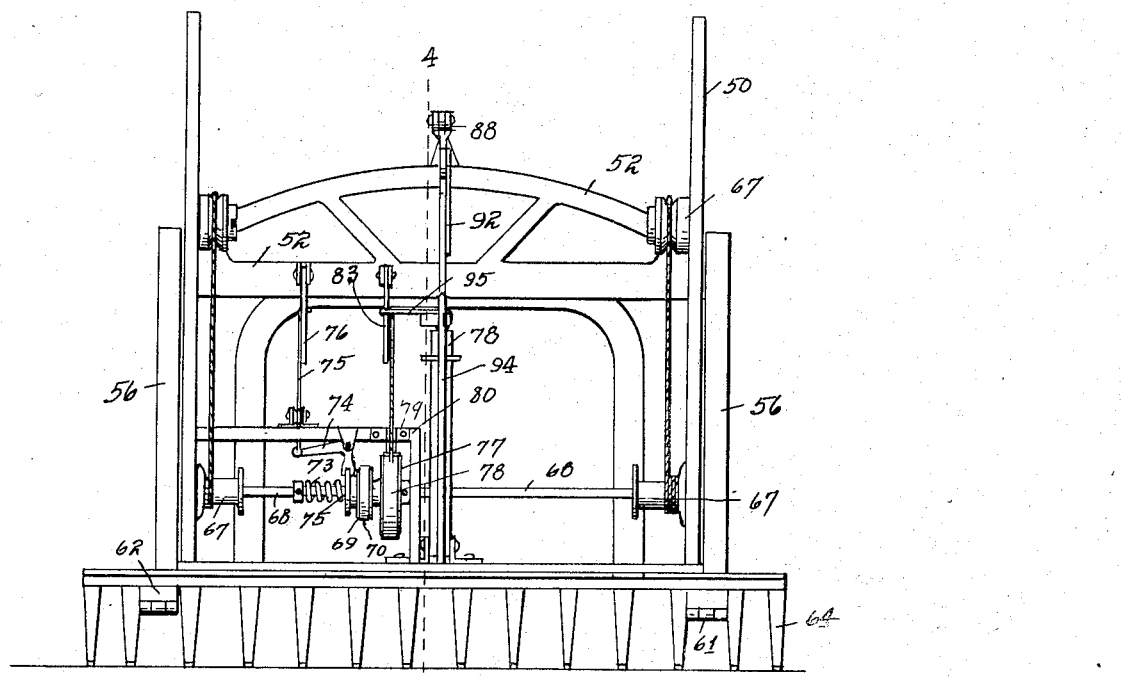
Figure 3 is a front elevation of my improved hay buck and loader with the tractor removed and the buck teeth or tines in loading position.

Assuming that it is desired to load the rake 84 and that the tractor is being advanced over the ground surface, the operator then grasps the lever 92 and swings it forwardly, which will tilt the upper end of the bar 87 forwardly, permitting the forward ends of the rake 84 to be lowered and to contact with the ground surface, after which a load of material, such as hay, may be pushed on the rake until it is loaded, after which the lever 92 is then moved rearwardly and latched, causing the free ends of the teeth 83 to be elevated, as illustrated in Figure 1. The load may then be carried to the stack, after which the lever 76 is actuated, permitting the clutch 72 to engage the pulley 69 and in turn the shaft 66 to be rotated, together with the drums 67, causing the forward end of the rake-supporting frame to be elevated to the dotted line position shown in Figure 1, carrying with it the load on the rake. The tractor may then be advanced carrying the load above the stack, after which the trip lever 97 may be grasped and actuated to cause the latch 95 to disengage the rod 93. The weight on the forward end of the rake will then cause the rake to be tilted to the dotted line position A as illustrated in Figure 1, permitting the load to be discharged on the stack. The stacker may then be backed away from the stack, after which the lever 83 is actuated, causing the band 78 to disengage the drum 77 and allowing the rake to be lowered by gravity.

If it is desired to remove the tractor from the stacker the pins 44 on the draw bar 43 are removed, after which the said bar 43 is removed from the hitch bar 45, the links 33 are disconnected from the plates 36, the levers 26 are then actuated to lower the skids 25 to carry the weight of the back ends of the members 12 and locked in that position. The tractor may then be moved rearwardly after the belt 70 has been removed from the pulley 71, requiring only a few minutes time to remove or attach the tractor. The axle 18 may be lengthened or shortened by simply removing the pins 20 and sliding the members 19 relative to each other and relative to the member 18.

If it is desired to use the portable frame for supporting machinery other than the stacker, the stacker may be easily and quickly removed by simply removing the bolt 53 from the frame members 13 and 52 and lifting the bar 48 from the axle 18, after which the other machine may be attached to said portable frame in any desired manner.

Thus it will be seen that I have provided a hay buck and stacker of comparatively simple and cheap construction wherein the load carried by the stacker and the weight of the stacker itself are carried principally by the caster wheels, providing great stability against tipping, as well as relieving the strains from the tractor frame, and further providing means whereby the tractor may be easily and quickly removed from the portable frame and utilized for other purposes if so desired.

I claim as my invention:

1. A hay buck and stacker, comprising a portable frame, including a pivoted front axle adjustable as to length, wheels supporting said axle, the rear end of said frame being arched to permit a tractor to be moved into and out of said frame beneath said arch, means supporting the rear end of said frame on said tractor, means for connecting the front end of said tractor to the front end of said frame whereby the frame will be guided by the tractor as it is advanced over the ground surface, a stacker frame having its forward end supported by said axle and its rear end pivoted to said arch, a rake-supporting frame having its rear end pivoted to said stacker frame, a rake, means for pivoting the rear end of said rake to said rake-supporting frame to permit dumping of the same, means latching said rake against dumping, control means for releasing said latching means, and means for elevating and lowering said rake frame.

2. A hay buck and stacker, comprising a portable frame, including a front axle adjustable as to length, wheels supporting said axle, the rear end of said frame being elevated to permit a tractor to be moved into and out of said frame beneath said rear end, means supporting the rear end of said frame on said tractor, means for connecting the front end of said tractor to the front end of said frame whereby the frame will be guided by the tractor as it is advanced over the ground surface, skids for supporting the rear end of said frame when the tractor is removed therefrom, and means for adjusting the elevation of said frame relative to said skids.

3. In a hay buck and stacker, a portable frame, means supporting the forward end of said frame, means for connecting the rear end of said frame to a tractor to be carried thereby, a stacker frame detachably supported on the portable frame, including upright guide posts at its forward end, a rake-supporting frame slidably mounted adjacent to said uprights and having its upper rear end pivoted to the stacker frame, an upright tilting bar pivotally carried by the forward end of said rake-supporting frame, a tilting rod having one end pivotally connected to the upper end of the tilting bar, means pivoting the other end of said rod to the stacker frame, the pivots of said tilting bar, said rake-supporting frame and the tilting bar being mounted in such a manner that the tilting bar will be maintained substantially in a pre-determined position relative to the vertical as the rake-supporting frame is elevated and lowered, a rake pivoted to the rake-supporting frame, an upright guide rod fixed to said rake adjacent to and parallel with said tilting bar, a latch pivoted on said tilting bar and operatively engageable with said guide rod, manually controlled means for releasing said latch, means actuated by power from a tractor for elevating said rake-supporting frame, and manually actuated means for controlling the last means.

4. In a hay buck and loader, a portable frame adapted to support a stacker, comprising front and side members, an arched back member to permit a tractor to be driven beneath said arch into said frame, a telescopic axle mounted on said front member, wheels supporting said axle, a skid supporting the rear end of each of said side members, means for adjusting the elevation of said side members relative to their respective skids, means for pivoting said axle on said front member, a pivot member carried by the arched portion of said frame, a supporting frame having one end carried by said axle and the other end carried by said pivot member, means for supporting the rear end of said frame on a tractor frame, and means for attaching the forward end of said frame to the forward end of the tractor frame.

5. A buck and loader comprising a portable frame, including an axle for supporting its forward end, ground-engaging devices supporting the ends of said axle, means for detachably supporting the rear end of the portable frame to a tractor frame positioned within said portable frame, a stacker frame detachably carried by said portable frame, a rake-supporting frame movably supported on said stacker frame, a buck rake pivoted to the forward end of said rake-supporting frame means for maintaining said rake in a substantially horizontal position as the rake-supporting frame is moved from its lowerd position to its elevated position, means for elevating said rake-supporting frame, and means for dumping said rake.

6. A hay buck and loader comprising an upright stacker frame, a rake-supporting frame on said stacker frame, including a rock shaft pivotally supported by the rear end of said stacker frame in a horizontal elevated plane, a downwardly and forwardly extending frame member fixed to each end of the rock shaft, a cross bar connecting the front ends of said forwardly and downwardly extending frame members, a buck rake, means for pivotally connecting the buck rake to said cross bar, an upright tilting bar pivotally supported on said cross bar, an upright guide rod fixed to the rear end of said buck rake, means for releasably and slidably latching the guide rod to said tilting bar, means for releasing said latching means to dump said buck rake, and means for elevating and lowering said rake-supporting frame.

7. A hay buck and stacker comprising a portable frame including a front axle pivoted to the front end of said frame, wheels supporting said axle, means supporting the rear end of said frame on a tractor, means detachably connecting the front end of a tractor to said frame whereby the frame will be guided by the tractor as it is advanced over the ground surface, skids for supporting the rear end of said frame when the tractor is removed therefrom, and means operatively connecting the skids and frame for raising and lowering the rear end of said frame relative to a tractor and the ground surface.

8. A hay buck and stacker comprising a portable frame having sides and a front member, an axle, means pivoting the axle to the central portion of the front member at a point above said front member, the rear end of said frame having the form of an arch open at its lower end to permit a tractor to be driven into and out of said frame, means for supporting the rear end of said portable frame on a tractor positioned therein, skids carried by the rear end of said portable frame for supporting the same when the tractor is disconnected therefrom, and means for elevating and lowering the rear end of said portable frame relative to the tractor.

9. In combination with a tractor a portable frame having side members and ground-engaging means for supporting the front end of said frame, the rear end of said frame having the form of an arch supported at its lower end on said side members, said arch being of a height and said side members spaced a distance apart to provide for a tractor being driven into and out of said frame, and means for supporting the rear end of said portable frame on a tractor.

10. In combination with a tractor a portable frame having sides and a front member, a telescopic axle, means pivoting the central portion of said axle to the central portion of said front member, steerable means portably supporting the ends of said axle, the rear end of said frame being in the form of an arch having its lower end open to permit a tractor to be driven into and out of said frame through said arch.

11. In combination with a tractor a portable frame having sides and a front member, a telescopic axle, means pivoting the central portion of said axle to the central portion of said front member, steerable means portably supporting the ends of said axle, the rear end of said frame being in the form of an arch having its lower end open to permit a tractor to be driven into and out of said frame through said arch, means for supporting the rear end of the portable frame on a tractor positioned within said frame, and means detachably connecting the front end of said frame and the front end of a tractor, whereby the said portable frame will be steered in unison with said tractor.

12. A hay buck and stacker comprising an upright portable stacker frame, a rake-supporting frame comprising a transverse rock shaft supported on the upper rear end of said portable frame and in an elevated horizontal plane, a downwardly and forwardly extending frame member fixed to each end of said rock shaft, a cross bar connecting the forward ends of said downwardly and forwardly extending frame members adapted to support a buck rake, and means carried by the stacker frame for elevating and lowering the free end of said rake-supporting frame.

13. A hay buck and stacker comprising an upright and portable stacker frame, a downwardly and forwardly extending rake-supporting frame having its upward end pivoted to the upper rear end of said stacker, said rake-supporting frame including a cross bar at its forward end, a buck rake, means pivotally supporting the rake to said cross bar, an upright tilting bar pivoted to said cross bar, means connecting said tilting bar and the buck rake to maintain the buck rake and tilting bar in fixed angular relation with each other, a rock arm operatively connected to the rake-supporting frame to oscillate in unison therewith, a bracket supported by said stacker frame, a lever having one end pivoted to said bracket, a link connecting said rock arm and said lever, and a rod connecting the movable end of said lever and the movable end of said tilting bar, said rock arm, lever, link and rod being so proportioned and arranged that as the rake is elevated and lowered the rake will be maintained in a substantially horizontal position, said link, rock arm and lever being mounted and operatively supported substantially below the pivot center of said rake-supporting frame.

14. In combination with a tractor a portable frame having side members, steerable wheels for supporting the front end of said portable frame, an arch at the rear end of said frame having its lower end supported on said side members, said arch being of a height and said side members spaced a distance apart to provide for the driving of a tractor beneath said arch and between said side members, means for attaching the front end of the tractor to said frame, and means on said frame for supporting the rear end thereof to provide for the connection and disconnection of said rear end with the tractor.

15. A hay buck and stacker comprising an upright and portable stacker frame, a downwardly and forwardly extending rake-carrying frame, pivot means at the top of said stacker frame for pivotally supporting said rake-carrying frame, a cross bar at the lower end of said rake-carrying frame, a rake carried on said cross bar, an upright tilting bar pivoted to said cross bar, a rock arm mounted on said pivot means and pivotally movable in unison with said rake-carrying frame, a lever having one end pivoted to said stacker frame, a link connecting said rock arm and said lever, and a rod connecting the movable end of said lever and the movable end of said tilting bar, said rock arm, lever, link and rod being so proportioned and arranged that as the rake is elevated and lowered the rake will be maintained in a substantially horizontal position.

16. In combination, a portable frame and a load-carrying frame, said portable frame including a front member, an axle for supporting the front end of said portable frame, means pivotally supporting the axle on said front member, and means pivotally supporting the rear end of said load-carrying frame on said portable frame, with the pivots for said axle and the rear end of said load-carrying means being positioned in a common plane extended longitudinally of said portable frame to provide for the pivotal movement of said load-carrying frame laterally of said portable frame.

17. In combination with a tractor a portable frame and a load-carrying frame, said portable frame including side members and a front member, an axle for supporting the front end of said portable frame, means pivotally supporting the axle on said front member at a point above the front member, arch means carried on the rear ends of said side members, with said arch being of a height and said side members spaced a distance apart to provide for the driving of a tractor within said portable frame, and means pivotally supporting the rear end of said load-carrying frame on said arch means, with the pivots for said axle and the rear end of said load-carrying means being positioned in a common plane extended longitudinally of said portable frame to provide for the pivotal movement of said load-carrying frame laterally of said portable frame.

JOHN E. RYAN.